J. B. BARTHOLOMEW.
SEED SEPARATING MECHANISM FOR PLANTERS.
APPLICATION FILED JUNE 21, 1911.
1,131,899.
Patented Mar. 16, 1915.
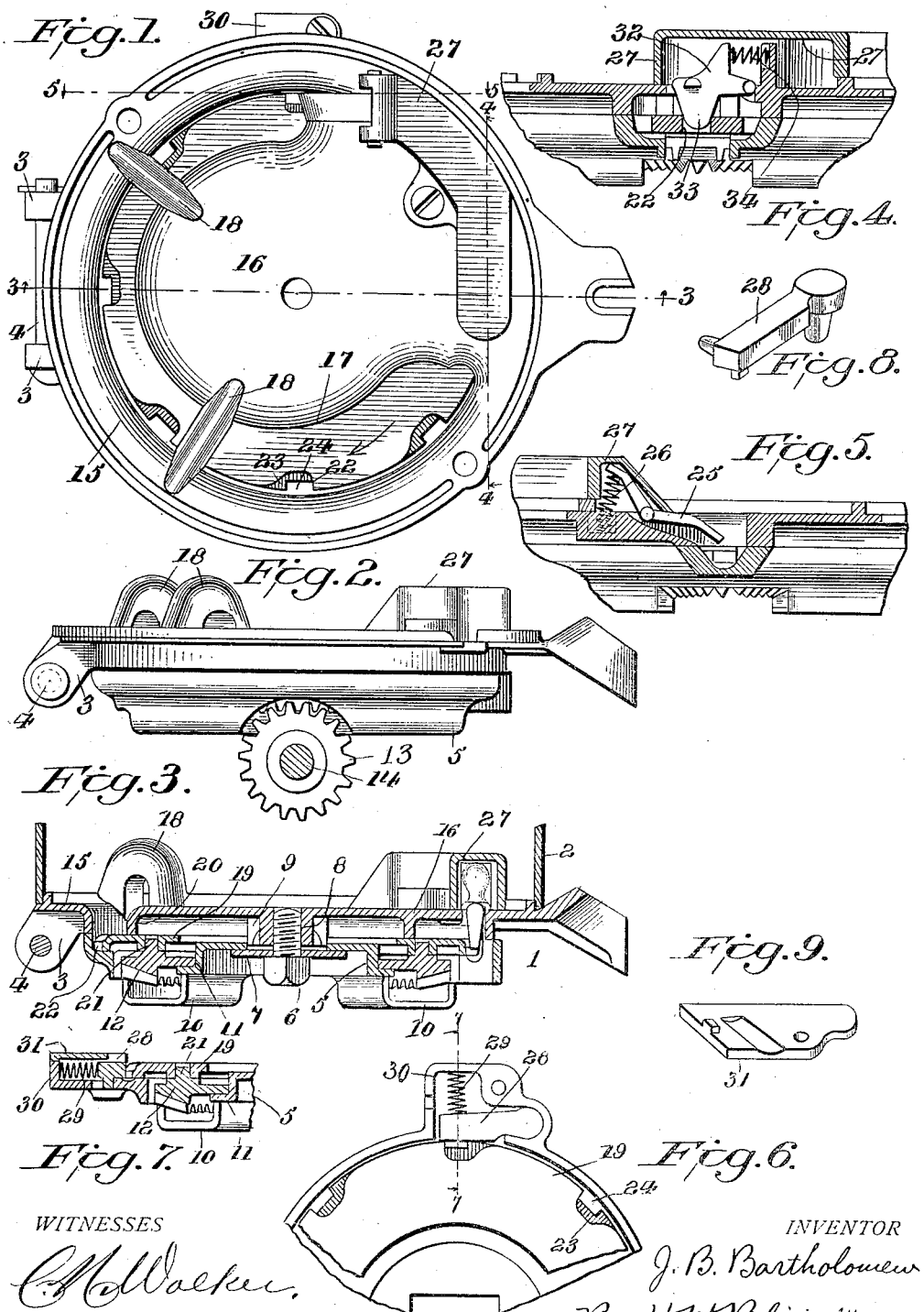

UNITED STATES PATENT OFFICE.

JOHN B. BARTHOLOMEW, OF PEORIA, ILLINOIS, ASSIGNOR TO AVERY COMPANY, A CORPORATION OF ILLINOIS.

SEED-SEPARATING MECHANISM FOR PLANTERS.

1,131,899.  Specification of Letters Patent.  Patented Mar. 16, 1915.

Original application filed March 6, 1908, Serial No. 419,434. Divided and this application filed June 21, 1911. Serial No. 634,511.

*To all whom it may concern:*

Be it known that I, JOHN B. BARTHOLOMEW, a citizen of the United States, residing at Peoria, in the county of Peoria and State of Illinois, have invented certain new and useful Improvements in Seed-Separating Mechanism for Planters, of which the following is a specification, reference being had therein to the accompanying drawing.

This invention relates to planters of the type adapted for planting corn, and has especially to do with the mechanism for separating and discharging the seeds to be planted from a hopper or receptacle in which they are contained.

One of the objects of the invention is to provide a mechanism having improved means for preventing seeds of unusual size or shape from being crushed.

Another object is to provide a mechanism having seed cells each so shaped as to be peculiarly adapted for receiving and retaining but a single seed.

Other objects will be apparent from the following specification.

In the accompanying drawings, which form a part of this specification, I have shown the form of my improved seed separating mechanism which I now deem preferable.

Of the drawings, Figure 1 is a plan view of the seed separating mechanism, the hopper and hopper cover being omitted. Fig. 2 is a side elevation of the parts shown in Fig. 1. Fig. 3 is a cross sectional view taken along the line 3—3 of Fig. 1. Fig. 4 is a cross sectional view taken along the line 4—4 of Fig. 1. Fig. 5 is a cross sectional view taken along the line 5—5 of Fig. 1. Fig. 6 is a detail plan view of the side valve and adjacent parts with the cover plate removed. Fig. 7 is a cross sectional view taken along the line 7—7 of Fig. 6. Fig. 8 is a perspective detail view of the side valve. Fig. 9 is a perspective detail view of the cover plate for the side valve.

1 represents as a whole the base or bottom plate to which are secured the side walls 2 of the hopper in which the seeds to be planted are retained. This base plate is mounted upon the frame of a planter in any desired manner as, for instance, by means of the lugs 3 which are pivoted upon a suitably supported pin or bolt 4. Secured to the under side of the plate 1 is a retaining plate 5. This is held in place by the bolt 6 which passes through the washer 7 and engages with the central threaded socket 8 formed in the base plate. The ribs 9 on the base plate enter a central aperture in the retaining plate and serve to center the latter with respect to the former. The retaining plate is made with the depending channel-shaped parts 10 and the rebate 11. In this rebate there is rotatably supported the bevel gear 12, the teeth of which move through the channel-shaped parts 10. The gear is driven by means of the meshing pinion 13 on the transverse operating shaft 14.

The hopper base plate 1 is provided with an outer annular part 15 to which the hopper walls are secured, and with a central flat part 16 which serves to support the greater part of the weight of the seeds in the hopper. Between the two parts 15 and 16 there is a channel 17 which extends through approximately 270 degrees. This channel tapers somewhat in the direction indicated by the arrow in Fig. 1, the outer edge of the channel being in the arc of a circle concentric with the axis of the hopper. Supporting brackets 18 may be provided to bridge the channel and to connect the parts 15 and 16.

19 is a rotary seed plate mounted between the gear 12 and the depending edges 20 of the base part 16. The plate is connected with the gear 12 for rotation therewith by means of lugs 21 which project from the gear into suitable sockets formed in the seed plate. The seed plate is provided at its periphery with a downward projecting flange in which are formed seed pockets or cells 22. These cells are peculiarly shaped and may be considered as having two parts, the upper, broader cavity 23 designed to hold a seed in flat horizontal position, and the lower, narrower pocket 24 designed to hold a seed in edgewise position.

In operation, it being assumed that the hopper 2 is filled with suitable seeds, such as corn, the seed plate 19 is rotated by means of the gear 12, the pinion 13 and the shaft 14. For planting in hills, this rotation should be intermittent, and for drilling, the rotation should be continuous. As the seed plate is rotated, kernels of corn readily enter the enlarged upper parts of the cells. The upper parts of the cells are large enough to receive a kernel even when lying on its side. An entrance of the kernels into the cells is, on this account, much more easily effected than is the case in other planters in which the seeds can enter the cells only edgewise. On account of the peculiar shape of the cells, a seed once entered, will gradually be worked downward into edgewise position in the lower part of the cell where it will project upward sufficiently to prevent other seeds from entering. The movement of the seeds into proper positions in the cells is aided by the converging walls of the channel 17. It will be noted that the upper parts of the cells are adapted not only to receive a kernel of normal size and shape in flat horizontal position, but are also adapted to permit the partial entry of rounded or abnormally shaped kernels which will not enter the lower narrower parts of the cells. There is, therefore, an assurance that all of the kernels will be fed out from the hopper and that large ones will not accumulate in it. At the end of the channel 17 there is located a cut-off 25 which serves to prevent the continued movement with the seed plate of any seeds not fully entered in the cells. This cut-off is pivotally mounted and is held in the normal position indicated in Fig. 5 by means of a small coil spring 26 which is positioned in the housing 27. It has been found in corn planters, as usually constructed prior to my invention, that unless the seeds are very carefully sorted, the thicker ones, when forced by the cut-off into the cells, will be frequently cracked and crushed against the outer stationary wall of the hopper base. To obviate this difficulty, I have provided at the cut-off point a side valve 28 which is held yieldingly against the edge of the seed plate by means of a spring 29 in an outward extending housing 30 formed as a part of the retaining plate 5. A cover 31, such as is indicated in Fig. 9, is provided for the housing 30. Beyond the cut-off 25 and preferably located beneath the housing 27 is an ejector or knock-out device 32 which may be of any usual or preferred type. In the drawings I have shown a pivotally mounted ejector having a depending part 33 which moves into and out of the cells under the control of the coil spring 34. The seeds which are discharged from the seed cells pass through a suitable valve controlled duct to the ground.

This application constitutes a division of my application for corn planters, filed March 6, 1908, Serial No. 419,434.

What I claim is:—

1. In a seed separating mechanism for a corn planter, the combination of a seed hopper, a horizontal rotary seed plate having a series of cells in its periphery each adapted to hold a single kernel of corn in vertical edgewise position, a cut-off device arranged to coöperate with the seed plate at the upper surface thereof, an annular wall surrounding the plate and serving to hold the seeds in vertical edgewise positions in the cells, the wall having an opening adjacent the cut-off device, and a resiliently held closure for the opening in the wall adapted to be moved when an unusually large seed is forced into a cell by the cut-off device.

2. In a seed separating mechanism for a corn planter, the combination of a seed hopper, a horizontal rotary seed plate having a series of cells in its periphery each adapted to hold a single kernel of corn in vertical edgewise position, a cut-off device arranged to coöperate with the seed plate at the upper surface thereof, an annular wall surrounding the plate and serving to hold the seeds in vertical edgewise positions in the cells, the wall having an opening adjacent the cut-off device and a section beyond the opening separated from the plate by a greater distance than is the section in advance of the opening, and a resiliently held closure for the opening in the wall adapted to be moved when an unusually large seed is forced into a cell by the cut-off device.

3. In a planter, the combination with the seed hopper, of the seed plate having seed cells formed around its edge, a protecting hood between the seed cells and upper receptacle part of the seed hopper for a part of the circumference of the seed plate, a cut-off mechanism where the seed plate enters under the hood yieldable vertically and horizontally.

4. In a seed separating mechanism for a planter, the combination of a hopper, a hopper base, a rotary seed plate, seed cells formed in the plate, one wall of each cell being formed by a non-rotating part of the hopper base, one section of which is yieldable outward from the centers of the cells, and cut-off and knock-out devices arranged at points adjacent the yieldable section.

In testimony whereof I affix my signature, in presence of two witnesses.

JOHN B. BARTHOLOMEW.

Witnesses:
J. M. CALDWELL,
L. M. STACY.

Copies of this patent may be obtained for five cents each, by addressing the "Commissioner of Patents, Washington, D. C."